United States Patent [19]

Taylor

[11] 4,405,198
[45] Sep. 20, 1983

[54] EXTENDED FIBER OPTIC SENSOR USING BIREFRINGENT FIBERS

[75] Inventor: Henry F. Taylor, Alexandria, Va.

[73] Assignee: The United States of America as represented by the Secretary of the Navy, Washington, D.C.

[21] Appl. No.: 295,989

[22] Filed: Aug. 25, 1981

[51] Int. Cl.³ .......................... G02B 5/172; G02F 1/00
[52] U.S. Cl. ................................. 350/96.29; 73/655; 367/169
[58] Field of Search .............. 350/96.15, 96.29, 96.30, 350/96.33; 367/140, 141, 169; 73/649, 653, 655, 657, 658; 340/380, 850; 250/227, 231 P; 181/110

[56] References Cited

U.S. PATENT DOCUMENTS

| | | | |
|---|---|---|---|
| 3,693,082 | 9/1972 | Jaecklin | 324/96 |
| 4,162,397 | 7/1979 | Bucaro et al. | 350/96.29 X |
| 4,173,412 | 11/1979 | Ramsay et al. | 356/33 |
| 4,235,113 | 11/1980 | Carome | 73/655 |
| 4,238,856 | 12/1980 | Bucaro et al. | 73/655 X |
| 4,255,018 | 3/1981 | Ulrich et al. | 350/375 |
| 4,297,887 | 11/1981 | Bucaro | 73/655 |
| 4,354,735 | 10/1982 | Stowe et al. | 350/96.29 |
| 4,363,114 | 12/1982 | Bucaro et al. | 73/655 X |
| 4,363,533 | 12/1982 | Stowe et al. | 350/96.33 |

OTHER PUBLICATIONS

Rashleigh et al., "Beam Forming Fibre Optic Sensor", *Electronics Letters*, vol. 17, No. 3, Feb. 1981, pp. 138-139.
Korth, "Integrated Optical Force and Stress Sensor", *IBM Tech. Discl. Bulletin*, vol. 24, No. 2, Jul. 1981, pp. 893-894.

*Primary Examiner*—John D. Lee
*Attorney, Agent, or Firm*—Robert F. Beers; William T. Ellis; Kenneth E. Walden

[57] ABSTRACT

An optical technique for detecting acoustic waves of selected frequency and determining their angle of arrival in a medium such as water. The technique utilizes one or more lengths of single mode optical fiber having a birefringence whose orthogonal axes are helically disposed throughout the length of the fiber at a predetermined uniform pitch. Sound pressure waves of certain frequencies incident upon the fiber throughout its length change its birefringence which affects the relative phase of polarized light components propagating from one end to the other by an amount proportional to the amplitude of the acoustic wave. The twisted optical fiber may be arranged in parallel with other like fibers and axes twisted at different pitches thereby enabling detection of sound waves over a range of frequencies and their angles of incidence.

11 Claims, 15 Drawing Figures

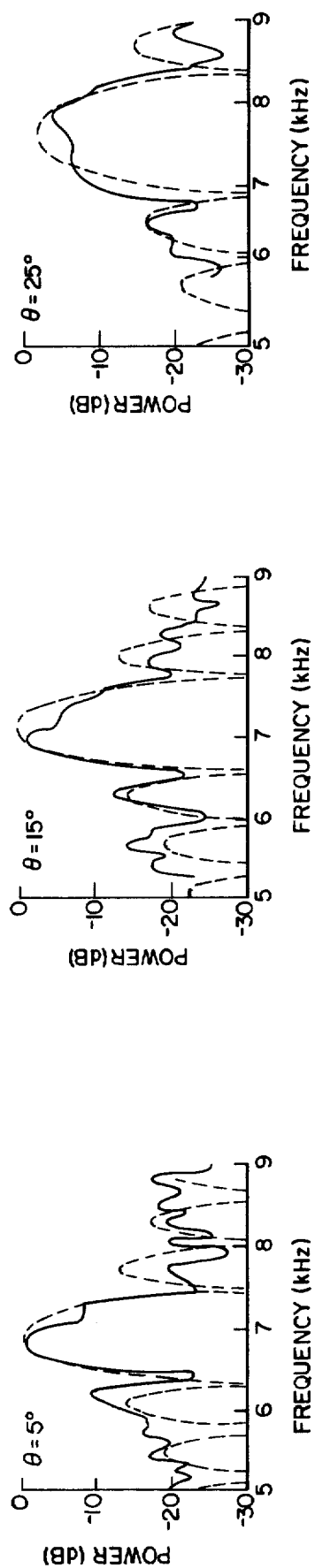
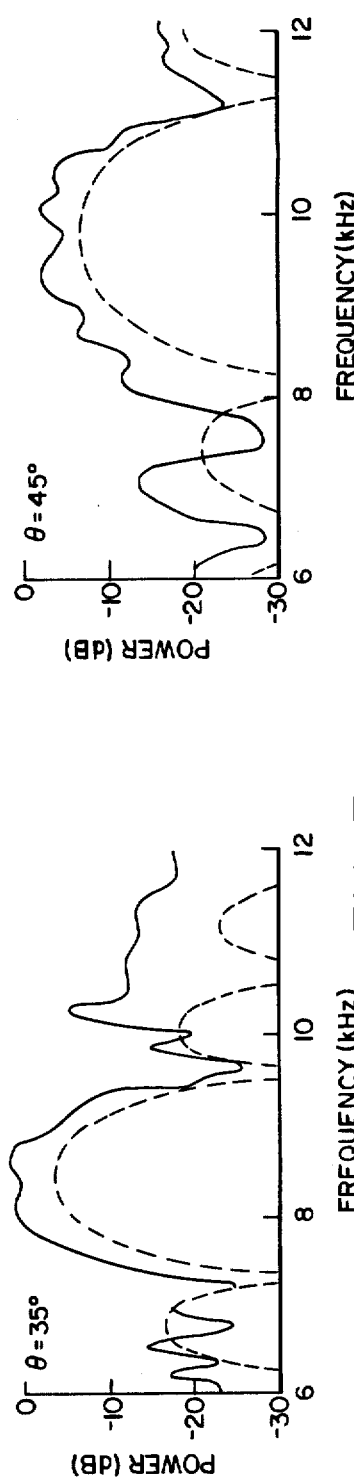
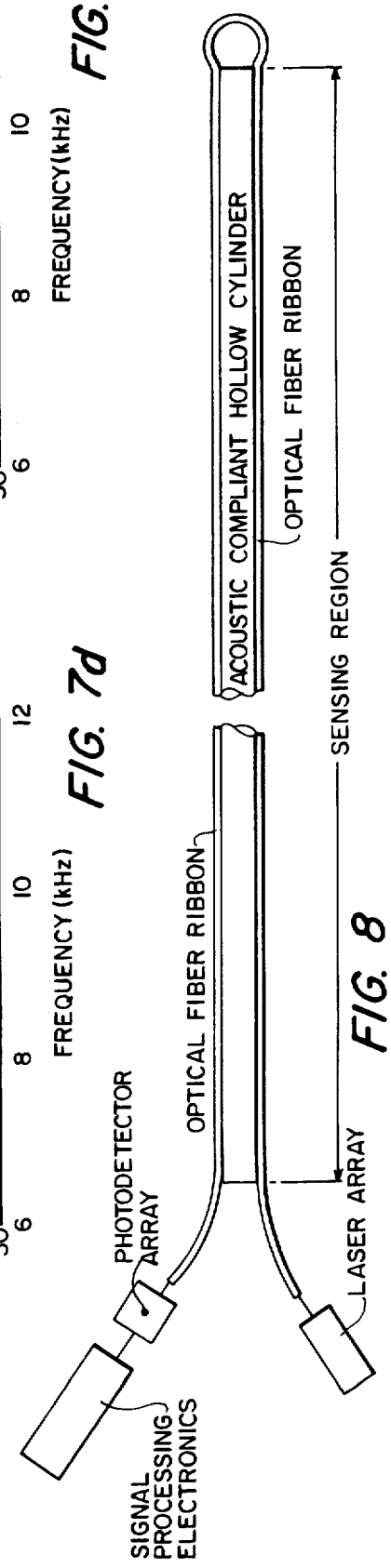
FIG. 7a  FIG. 7b  FIG. 7c  FIG. 7d  FIG. 7e  FIG. 8

EXTENDED FIBER OPTIC SENSOR USING BIREFRINGENT FIBERS

BACKGROUND OF THE INVENTION

Hydrophone arrays are widely used in acoustic detection systems. In such systems signals received from discrete sensors are processed for signal detection and for acquiring information on the angle of incidence. Signal processing requirements of sonar arrays are often quite severe and in some cases real time processing cannot be acomplished even with large computers. Furthermore, a large amplitude signal from one source tends to obscure a small signal from another source due to the limited dynamic range of individual hydrophones.

Optical fiber acoustic sensors recently introduced into the art employ single mode optical fibers arranged in the form of a Mach-Zender interferometer provided with parallel optical paths for defining sensing and reference arms. In this type of sensor, the acoustic wave changes the optical path length of the sensing arm fiber relative to the path length of the reference arm fiber. An example of this type of acoustic sensor is disclosed and claimed in U.S. Pat. No. 4,162,397 issued July 24, 1979 to Joseph A. Bucaro et al., for Fiber Optic Sensor. Further insight into acoustic sensors of this type are illustrated and discussed in Applied Optics 16, 1761 (77).

An acoustic sensor according to the Mach-Zender arrangement has only one of its fibers exposed to the environment in which it operates. The pressure of environmental fluctuations, such as temperature changes or interfering sound waves, cause a phase shift in light passing through the separate arms.

SUMMARY OF THE INVENTION

The present invention relates to a single optical fiber (or ribbon of parallel optical fibers) deployed in linear fashion along a considerable length of a compliant cylindrical member for response to selective acoustic wave frequencies for determining angle of arrival of the acoustic wave. An important feature of this invention is that each optical fiber is provided with a twist induced birefringence by being twisted at different pitches, whereby applied acoustic pressure changes the birefringence $\delta n_x - \Delta n_y$ to produce a beam forming sensor, i.e. one which is angle and frequency selective.

OBJECTS OF THE INVENTION

It is an object of the invention to provide an acoustic sensor.

It is another object of the invention to provide an acoustic sensor which is frequency and angle of incidence selective.

It is still another object of the invention to provide a twisted single mode optical fiber having birefringent axes disposed at a pitch so that it is frequency and angle of incidence selective.

It is yet another object of the invention to provide an array or ribbon of parallel single mode optical fibers each twisted to a different pitch for selectively discriminating the frequency and angle of arrival of acoustic waves.

Other objects of the invention will become apparent to one upon becoming familiar with the disclosure herein when considered in conjunction with the claims and drawings annexed hereto.

BRIEF DESCRIPTION OF THE DRAWINGS

FIGS. 7a through 7e are graphs of actual and theoretical response spectra for different angles of acoustic incidence on the optical fiber.

FIG. 8 illustrates an acoustic sensor arrangement where an optical fiber ribbon, such as disclosed in cross section in FIG. 2a, is disposed out of and returned on or in the wall of an extended acoustically compliant hollow cylinder.

DESCRIPTION OF THE PREFERRED EMBODIMENTS

Figure 1:
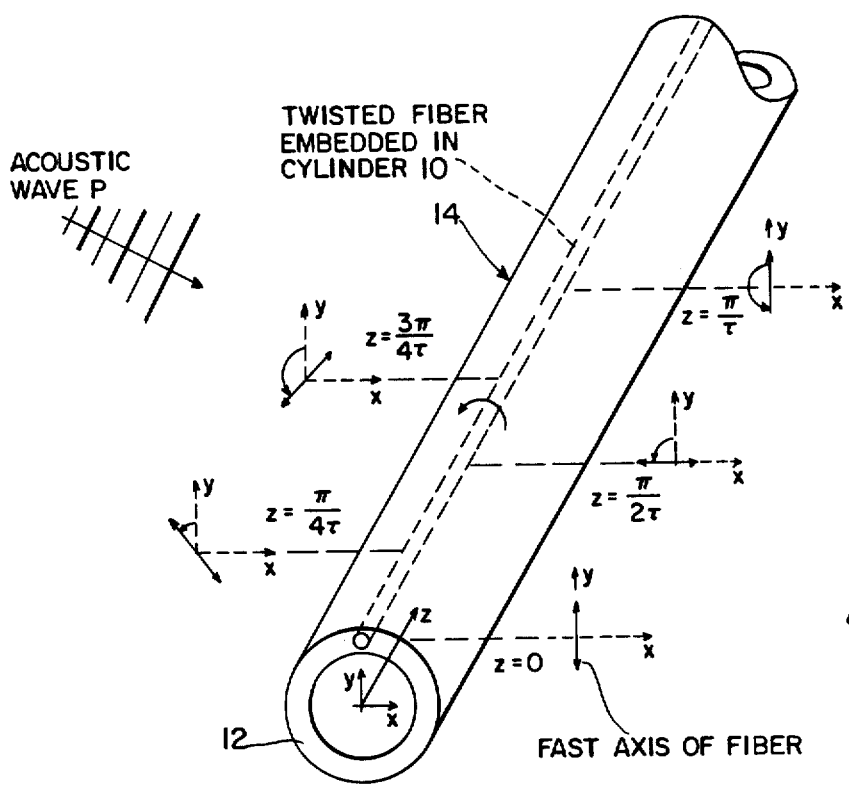
FIG. 1 shows in perspective a twist birefringent optical fiber embedded longitudinally in the wall of an elongate pressure compliant cylindrical member.
Figure 1A:
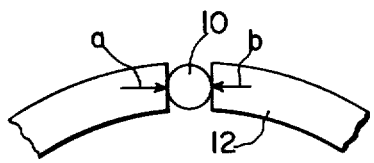
FIG. 1a illustrates how strain is applied by the cylinder wall to the twisted birefringement optical fiber.
Figures 2, 2A:
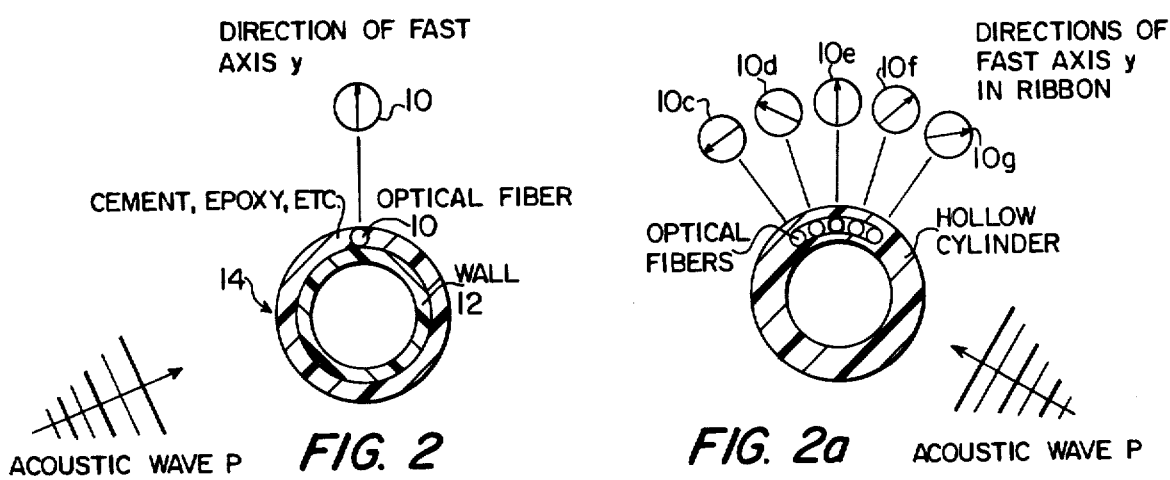
FIG. 2 is a cross sectional view of a first alternate embodiment showing the optical fiber mounted on the compliant cylindrical member, and illustrating the direction of its fast axis.
FIG. 2a is a cross sectional view of a second alternate embodiment showing an array of optical fibers in the form of a ribbon in the wall of the cylinder, and illustrating the direction of their fast axes.

Referring now to the drawings, there are shown several embodiments of the invention. FIG. 1 shows optical fiber 10 embedded in wall 12 of pressure compliant elongate cylindrical tubular mandrel or member 14 for defining a sensing region. The optical fiber is intrinsically highly birefringent with its fast axis disposed in the y direction and its slow axis in the x direction. The z direction is the direction in which light propagates through the fiber. The fiber's birefringence $\Delta_n = n_{yo} - n_{xo}$ in the absence of a perturbing pressure wave, and $\Delta_n = n_{yo} - n_{xo} + (C_y - C_x) P$ in the presence of an acoustic pressure field, where $n_{yo}$ and $n_{xo}$ are the indices of refraction in the y and x directions, respectively, P is the pressure, and $C_y$ and $C_x$ are constants. Optical fiber 10 is single mode which allows only one mode propagation for each of the two orthogonal polarizations which define its birefringent axis. Optical fiber 10, which is provided with an intrinsic birefringence which is relatively high, is twisted about its longitudinal axis at a uniform pitch along its length. The fiber's initial or intrinsic birefringence is affected by both twist-induced circular birefringence and pressure induced birefringence. The optical fiber may be either embedded in the relatively thin cylindrical wall of the tubular mandrel or member, as illustrated in FIG. 1, or firmly cemented or epoxied to the outside thereof, as illustrated in FIG. 2. In either configuration, the central or longitudinal axis of the fiber is parllel with the axis of the cylinder, and pressure received omni-directionally from acoustic wave P is transmitted by wall 1 to introduce anistropic strain in the fiber. The strain causes a change in the effective fiber birefringence, and its magnitude and sign depends on the orientation of its x and y axes relative to the cylindrical surface. Reference may be made to FIG. 1a where a cross sectional representation illustrates the direction that pressure is applied by wall 12 to optical fiber 10 for all angles of acoustic pressure P incidence. Pressure is applied to the fiber in substantially the same manner independent of whether the fiber is embedded in the wall or cemented thereto. Either arrangement provides anisotropic strain in the fiber when the cylinder is subjected to a pressure wave. It may be assumed, for purposes of this invention, that all pressure is applied as a unidirectional squeeze pressure on the fiber from opposite sides throughout its length as indicated by arrows a and b. The dependence of the change in fiber birefringence on applied pressure is spatially periodic along the length of the fiber with the period defined as $L=180/\tau$ where $\tau$ is the pitch of the fiber twist, in degree per unit length, or a half pitch (180°). At the position of the mandrel facing the viewer as illustrated in FIG. 1 ($z=0$), the birefringent fiber is illustrated with its fast axis y disposed vertically or perpendicular to the outer cylindrical surface. Progressing along the fiber away from the viewer to a position of $\frac{1}{8}$ pitch ($Z=\pi/4\tau$), the fast axis y has rotated 45° counter clockwise. At $\frac{1}{4}$ pitch ($Z=\pi/2\tau$), the fast axis y has rotated 90°. Finally, at $\frac{1}{2}$ pitch ($Z=\pi/\tau$), the fast axis y has rotated 180°. This half of a complete pitch defines a spatial period of response. When mandrel 14 is subjected to acoustic pressure waves, it transmits responsive pressures to the optical fiber substantially only according to the directions of arrows a and b in FIG. 1a and introduces further anisotropic strain in the fiber material. This strain causes a change in the effective fiber birefringence, and the magnitude and sign of this change depends on the orientation of the fiber axis relative to the cylindrical surface. For example, the birefringence change is (+) at positions $z=0$ and $z=\pi/\tau$; is (−) at position $z=\pi/2\tau$; and is (0) at positions $z=\pi/4\tau$ and $Z=3\pi/4\tau$.

From the above it will become apparent that an acoustic wave, having its maxima arriving at positions $z=0$ and $z=\pi/\tau$ (or every half pitch) at substantially the same time (in concert, or in unison) causes wall 12 of the mandrel to squeeze the fiber in the direction indicated by arrows a and b in FIG. 1a. This squeeze pressure, when the optical fiber fast axis y is disposed normal to the surface of mandrel 14, causes an additive change (+) in the optical fiber's birefringence. The birefringence change is further enhanced at position $z=\pi/2\tau$, for example, where a (−) change helps render a greater birefringence difference between the fast and slow axis. The spatial periods $L=180/\tau$ (half pitches) continue along the length of optical fiber 10 and define a sensing region which is identified in the several sensor arrangements.

Figure 3:
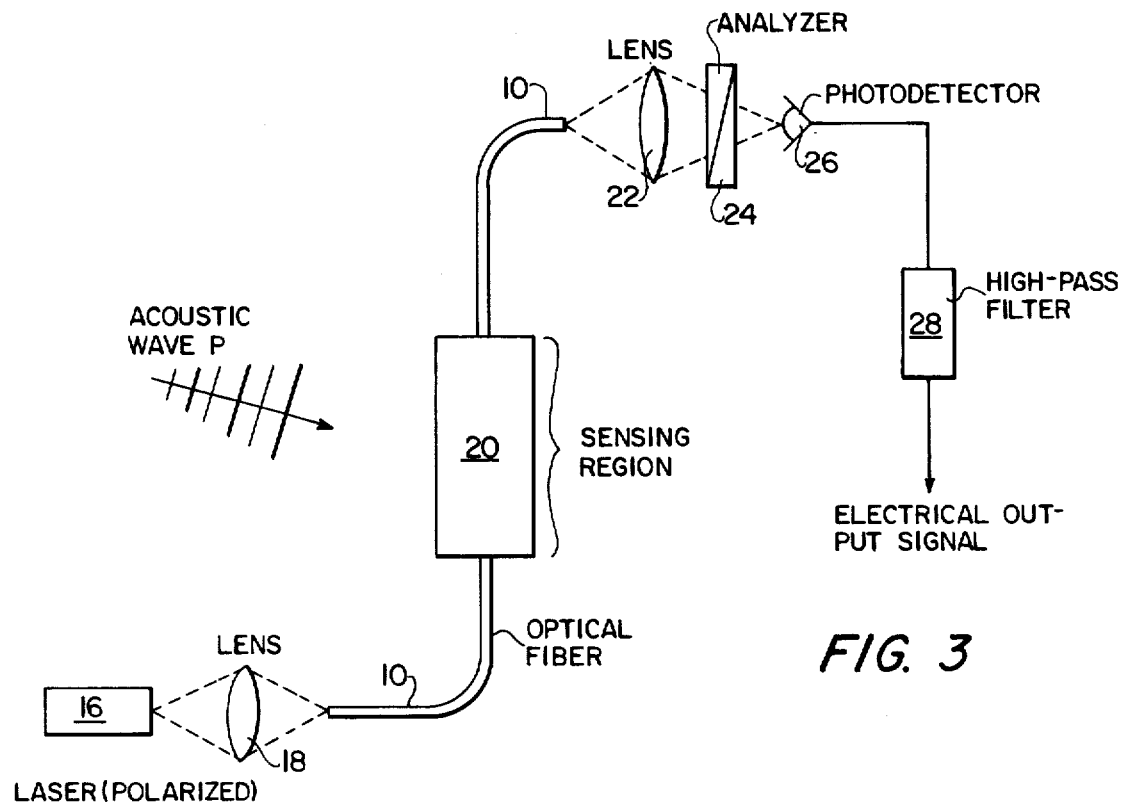
FIG. 3 shows an optical arrangement defining an acoustic sensor.

In the optical arrangement illustrated in FIG. 3, polarized light from laser 16 is coupled by lens 18 into one end of optical fiber 10 with its polarization vector oriented at approximately 45° with respect to the fiber's birefringent axes y and x. The polarized light propagates through the fiber as circularly polarized light, and its rate of rotation is effected by the pressure induced birefringence change. The light exits fiber 10, is collected by lens 22, and made incident upon analyzer 24, which has its axis also oriented at approximately 45° with respect to the axis of fiber 10 where the light exits. The light is then transmitted through the analyzer and focused on photodetector 26. Phase change induced in the light in passing through sensing region 20 leads to intensity modulation of the light passing through analyzer 24. An electrical signal produced by the photodetector is first passed through a high-pass filter 28 to remove the dc component. The signal exiting the high-pass filter represents the sensor output signal. This signal is present only when the sensing region receives an acoustic wave P. By knowing the frequency or wavelength maxima which arrive in concert at the period positions on the optical fiber, its angle of arrival can be calculated.

Figure 4:
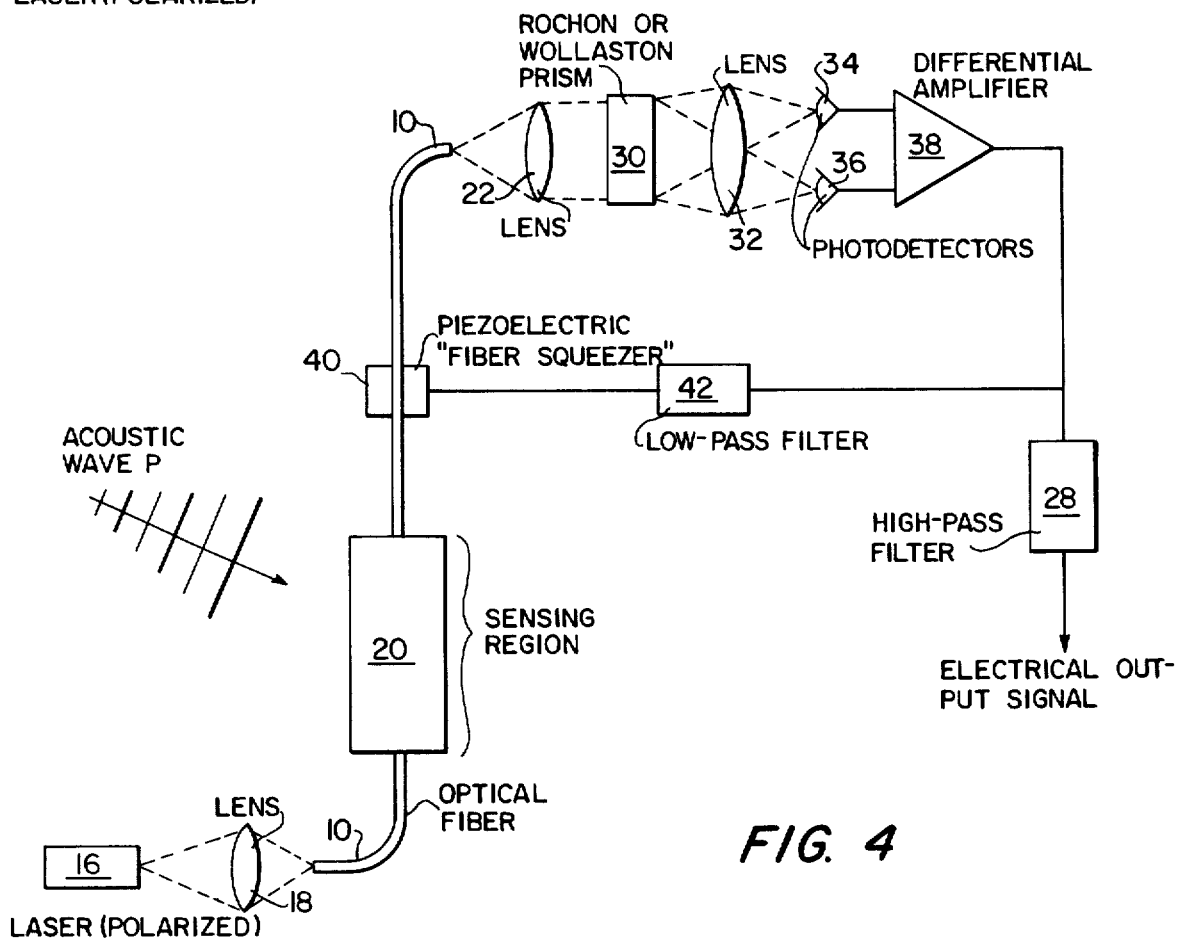
FIG. 4 shows another optical arrangement defining an acoustic sensor having a dual output with a feedback to maintain high sensitivity in the presence of low frequency noise and drift.

FIG. 4 represents an arrangement very similar to that just described with reference to FIG. 3, and like numerals have been applied for identifying common elements. FIG. 4 differs in that it includes a Rochon or Wollaston prism 30 (instead of an analyzer) to separate the output from lens 22 into two orthorgonally polarized output beams, which are passed through lens 32 onto a pair of photodetectors 34 and 36. The signals produced by the photodetectors are processed electronically through differential amplifier 38. The output is passed on to high pass filter 28 to remove dc signals, and the emerging signal represents the sensor electrical output. FIG. 4 may be further modified by incorporating a feedback arrangement to apply a squeeze pressure to optical fiber 10 at its exit from the sensing region. The effect of low frequency noise and drift may be eliminated by incorporating a piezoelectric element 40 on the downstream side of low pass-filter 42 to surround fiber 10 to squeeze it in response to a difference signal from the two photodetectors. Removal of such low frequency signals allow the sensor to operate at high sensitivity to small induced phase shifts.

Figure 5:
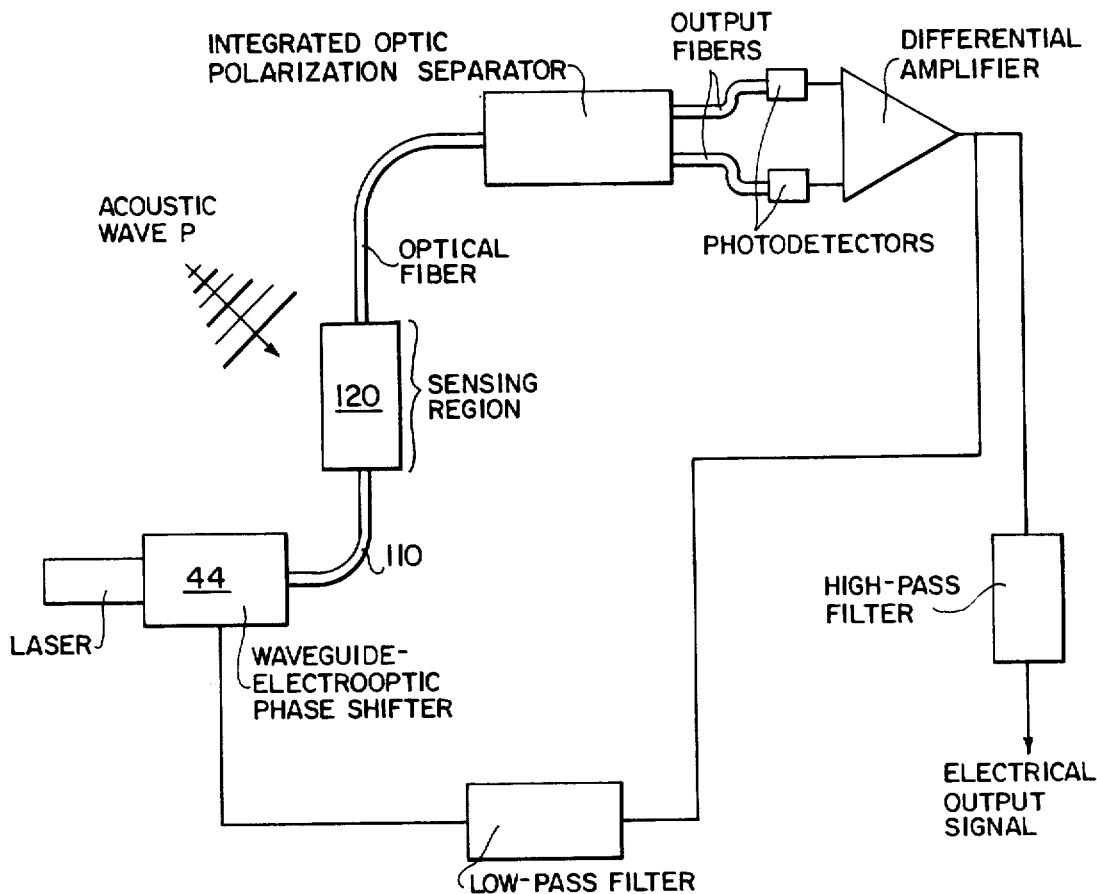
FIG. 5 is an alternate arrangement defining an acoustic sensor.

In FIG. 5 there is disclosed an alternate embodiment making use of all solid state components from light source to detector to eliminate all air paths and resulting component motion problems. An electrooptic phase shifter 44 produces a relative phase shift between transverse electrical (TE) and transverse magnetic (TM) modes coupled together. The phase shifted light is coupled into optical fiber 110 leading to sensing region 120. Output from the sensing region is passed to an integrated optic polarization separator where it is divided into two orthogonally polarized components. They are intensity modulated in response to birefringence changes induced in the sensing region. These intensity modulating components are detected by separate photodetectors. Signal outputs therefrom are directed to a differential amplifier and further processed as in the arrangement described with reference to FIGS. 4 and 5.

Figure 6:
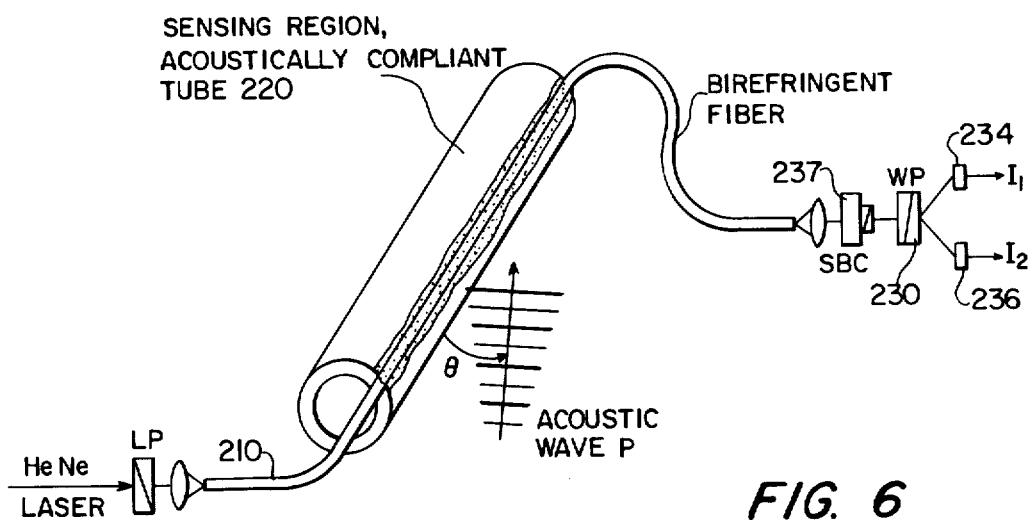
FIG. 6 is a perspective view of an acoustic sensor arrangement similar to FIG. 4 illustrating response as a function of acoustic frequency and angle of incidence $\theta$ to the optical fiber.
Figure 9:
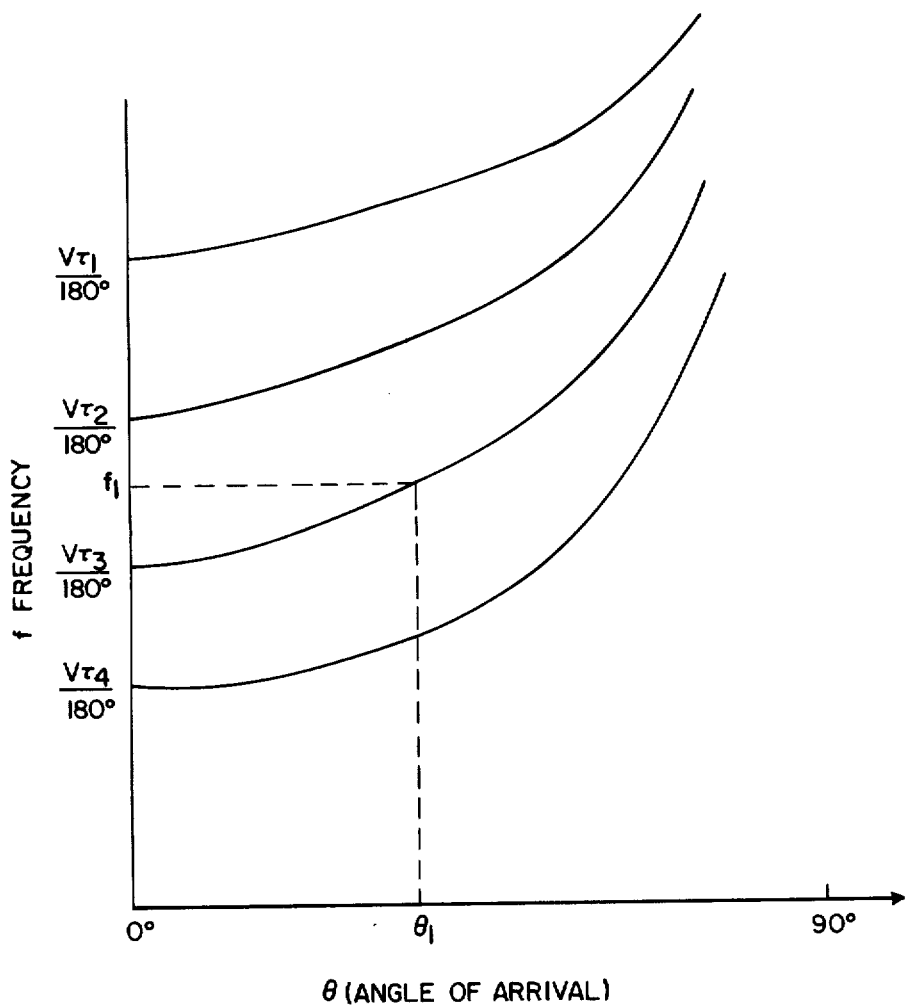
FIG. 9 represents curves of maximum sensitivity for a sensor in frequency-angle relationship for different values of pitch $\tau$.

The frequency of maximum sensitivity for the sensor is given by the formula $f=V\tau/\pi\cos\theta$, where V is the acoustic velocity in the ambient medium, $\tau$ is the fiber pitch twist, and $\theta$ is the angle of arrival of the acoustic wave, as illustrated in FIG. 6. The locus of maximum sensitivity in frequency-angle space is plotted in FIG. 9, for values of $\tau$. Note that if the frequency of a signal is determined (i.e., using an electronic spectral analysis device for the electrical output of the sensor) for a particular fiber sensor with pitch $\tau$, the angle of arrival can be deduced immendiately from this formula.

FIGS. 7a through 7e represent output signals processed at various angles of arrival of acoustic waves P incident on a sensing region, such as 220 illustrated in FIG. 6. In FIG. 6, polarized light is coupled into fiber 210 at θ=45° to the fiber fast and slow axis y and x (eigenmodes), exciting them equally as previously described with reference to the other embodiments. Wollaston prism 230, oriented at 45° with respect to the optical fiber axes, directs divided light to photodetectors 234 and 236 which provide signals $I_1$ and $I_2$, respectively. A Soleil-Babinet compensator (SBC) 237 is provided and oriented with its axis aligned with the fiber axis and adjusted so that the quadrature condition of the two beams is satisfied. FIGS. 7a through 7e show both theoretical (dashed lines) and actual (solid lines) plots for power output for angles of arrival θ=5° through 45° at 10° intervals.

Refer once again to FIG. 2, which is a cross-sectional view arbitrarily taken at one of the positions where fast axis y is disposed normal to the surface of the mandrel. Pressure applied to the fiber in this position, as illustrated in FIG. 1a, increases the fiber's birefringence at this position and at every half pitch thereafter.

In FIG. 8 there is illustrated an elongate compliant hollow cylindrical or mandrel having a length of a few meters to as much as a kilometer or more with a ribbon of optical fibers disposed along its length, both out and return. FIG. 2a is a typical cross sectional representation of a ribbon of optical fibers either cemented on or molded into the wall of a hollow cylinder, such as shown in FIG. 8. The optical fibers defining this ribbon are each twisted at a different pitch, and, at any selected cross section, such as illustrated in FIG. 2a, their fast axes are disposed in different directions. Optical fiber 10e is illustrated with its fast axis disposed vertically, or normal to the outer surface of the mandrel. Optical fiber 10c is illustrated with its fast axis disposed generally parallel to the surface of the mandrel, and optical fiber 10d is illustrated with its fast axis at 45° with respect to the mandrel surface. When squeeze pressures a and b (FIG. 1a) are applied by the cylinder wall in response to traveling maxima of acoustic wave lengths, the wall of mandrel 14 squeezes the fiber. When this squeeze pressure is applied to the fiber ribbon at the position of cross sectional view FIG. 2a, the birefringence of fiber 10e, for example, is increased (+), and the birefringence of fiber 10c is decreased (−). However, the same squeeze pressure applied to fiber 10d (disposed at 45° to the mandrel surface) does not change its birefringence.

When the optical fibers are disposed in the form of a ribbon, they are adaptable for signal processing in arrays. Each fiber may be associated with its own light source and detector, or exposed to a common light source and detector system. In FIG. 8, it will be noted that the fibers extend out and return along the mandrel and that the active elements (light source, detector and electronics) are located in a package at one end, which could be on a ship. A sensing region is defined which may range in length from a few meters to as much as a kilometer or more, and it is adapted to be deployed in water for detecting acoustic waves emanating from a source and their angle of arrival.

When the optical fibers are located on the mandrel as illustrated in FIG. 8, it is necessary that the half pitch positions of any particular fiber be opposite each other on both the out and return runs for additive birefringence changes. Otherwise, birefringence may be cancelled.

There have been described embodiments defining acoustic sensors for detecting pressure waves of a particular frequency and determining their angle of arrival.

While the invention has been particularly shown and described with reference to specific embodiments thereof, it will be understood by those skilled in the art that various changes in form and details may be made thereto without departing from the spirit and scope of the invention which is limited only by the scope of the claims annexed hereto.

What is claimed is:

1. In a sensor for sensing waterborne acoustic pressure waves of selected frequency, a sensor region comprising:
   an elongate pressure compliant tubular member adapted to be disposed in water for receiving incident acoustic pressure waves; and,
   plural parallel birefringent optical fibers fixedly secured longitudinally to the wall of the tubular member with their orthogonally disposed fast and slow axes twisted at different helical pitches of length L along their longitudinal extends which define plural response periods, respectively, of L/2 distance apart where their fast axes are disposed normal to the tubular member outer surface;
   said wall adapted to apply squeeze pressure along the fibers in a direction generally only parallel to the tubular member outer surface in response to an incident acoustic pressure wave on the tubular member;
   whereby acoustic sound waves whose wavelength maxima apply squeeze pressure along all the optical fibers, but, only when the maxima arrive in substantial unison at a plurality of response periods of a particular fiber, do they additively change the birefringence of that particular fiber to cause maximum relative phase shift in polarized light components passing through the fiber to identify an acoustic pressure wave of a particular frequency.

2. A sensor for sensing waterborne acoustic pressure waves of selected frequency comprising:
   an elongate pressure compliant tubular member adapted to be disposed in water to receive incident acoustic pressure waves and comply thereto;
   plural parallel birefringent optical fibers fixedly secured longitudinally to the wall of the tubular member with their orthogonally disposed fast and slow axes twisted at different helical pitches L along their longitudinal extents;
   means for launching polarized light into one end of each of the optical fibers;
   means for detecting relative phase shift of the polarized light components emanating at respective opposite ends of the optical fibers;
   said pressure compliant tubular member wall being relatively thin and adapted for applying unidirectional squeeze pressure against opposite longitudinal sides of the optical fibers in response to incident omnidirectional acoustic pressure waves for additively changing birefringence of the optical fibers at spatial periods of L/2 distance apart where the fibers' fast axes are perpendicular to the wall outer surface;
   whereby, when a maximum phase shift in polarized light components is detected in one of the optical fibers, there is identified an acoustic pressure wave frequency whose wavelength maxima are arriving in concert at the spatial periods L/2 along that fiber.

3. The invention according to claim 1 or 2 wherein the plural optical fibers are located in the wall of the elongate pressure compliant tubular member.

4. The invention according to claim 1 or 2 wherein the pressure compliant tubular member carries the longitudinally disposed optical fibers both out and return along its elongate extent.

5. The invention according to claim 4 wherein the optical fibers are embedded in the wall of the elongate pressure compliant tubular member.

6. The invention according to claim 2 wherein the polarized light launching and detecting means are both located at one end of the elongate pressure compliant tubular member, and the optical fibers extend both out and return along the member.

7. The invention according to claim 5 wherein the tubular member wall thickness dimension is substantially less than its radius dimension.

8. A method of sensing waterborne acoustic pressure waves of selected frequency comprising the steps of:
twisting an optical fiber so that its birefringent orthogonally disposed fast and slow axes are helically disposed therealong at a predetermined pitch L;
launching polarized light into one end of the optical fiber and measuring relative phase shift of its components emanating from the other end in response to a change in the optical fiber birefringence; and,
converting waterbore acoustic pressures to squeeze pressures on the optical fiber which cause additive birefringence in the optical fiber at spatial periods of L/2 therealong where the fiber's fast axis is normal to the squeeze pressure;
whereby measured maximum relative phase shifts of polarized light components indicate the presence of acoustic pressure waves of a frequency whose wavelength maxima are arriving in unison at the spatial periods.

9. A method of sensing the presence of waterborne acoustic pressure waves of selected frequency comprising the steps of:
twisting birefringent optical fibers so that their orthogonal fast and slow axes are helically disposed at different pitches L along their lengths;
arranging the fibers longitudinally parallel with each other;
passing polarized light into one end of each optical fiber and measuring relative phase shifts of components emanating from respective opposite ends in response to changes in birefringence in any of the fibers; and,
converting waterborne acoustic pressure maxima to squeeze pressures on all of the optical fibers along their longitudinal extents;
whereby acoustic pressure waves having wavelengths such that their pressure maxima, arriving in substantial unison on any of the optical fibers having spatial periods of L/2 distance apart, additively change its birefringence where the fast axes are normal to the squeeze pressures to cause a detectable phase shift in polarized light components to identify the presence of an acoustic wave having a particular frequency.

10. In a sensor for sensing waterborne acoustic pressure waves of a selected wavelength, a sensor region comprising:
an elongate pressure compliant tubular member adapted to be disposed in water for receiving incident acoustic pressure waves; and,
a birefringent optical fiber fixedly secured longitudinally to the wall of the tubular member with its orthogonally disposed fast and slow axes twisted at a helical pitch on length L along its longitudinal extent to define a response period of L/2;
said wall adapted to apply squeeze pressure along the fiber in a direction generally only parallel to the tubular member outer surface in response to an incident acoustic pressure wave on the tubular member;
whereby acoustic sound waves that apply squeeze pressure along the optical fiber with substantial periodicity of the response period along the fiber additively change the birefringence of the fiber to cause a relative phase shift between polarized light components passing through the fiber in order to identify an acoustic pressure wave of a particular wavelength.

11. A sensor for sensing waterborne acoustic pressure waves of a selected wavelength comprising:
an elongate pressure compliant tubular member adapted to be disposed in water to receive incident acoustic pressure waves;
a birefringent optical fiber fixedly secured longitudinally to the wall of the tubular member with its orthogonally disposed fast and slow axes twisted at a helical pitch L along its longitudinal extent;
means for launching polarized light into one end of the optical fiber;
means for detecting a relative phase shift between the polarized light components emanating at the opposite end of the optical fiber;
said pressure compliant tubular member wall being relatively thin and adapted for applying unidirectional squeeze pressure against opposite longitudinal sides of the optical fiber in response to incident acoustic pressure waves for additively changing the birefringence of the optical fiber at spatial periods of L/2 where the fiber's fast axes are perpendicular to the wall outer surface;
whereby, when a relative phase shift between polarized light components is detected in the optical fiber, there is identified an acoustic pressure wave whose maxima are arriving in concert at the spatial periods L/2 along the fiber.

* * * * *